United States Patent
Liu et al.

(10) Patent No.: US 10,910,959 B2
(45) Date of Patent: Feb. 2, 2021

(54) MULTI-DIRECTIONAL ACTUATOR

(71) Applicant: MEMS Drive, Inc., Pasadena, CA (US)

(72) Inventors: Xiaolei Liu, South Pasadena, CA (US); Roman Gutierrez, Arcadia, CA (US); Matthew Ng, Rosemead, CA (US); Guiqin Wang, Arcadia, CA (US)

(73) Assignee: MEMS Drive, Inc., Pasadena, CA (US)

( * ) Notice: Subject to any disclaimer, the term of this patent is extended or adjusted under 35 U.S.C. 154(b) by 0 days.

(21) Appl. No.: 16/252,042

(22) Filed: Jan. 18, 2019

(65) Prior Publication Data
US 2019/0157988 A1    May 23, 2019

Related U.S. Application Data

(62) Division of application No. 14/818,086, filed on Aug. 4, 2015, now Pat. No. 10,211,757.

(51) Int. Cl.
*H02N 1/00* (2006.01)

(52) U.S. Cl.
CPC .................. *H02N 1/008* (2013.01)

(58) Field of Classification Search
CPC ..................................... H02N 1/008
USPC ......................................... 310/309
See application file for complete search history.

(56) References Cited

U.S. PATENT DOCUMENTS

| 5,375,033 A | 12/1994 | MacDonald |
| 6,360,035 B1 | 3/2002 | Hurst, Jr. et al. |
| 2008/0315092 A1* | 12/2008 | Kley ............... G01N 23/225 250/307 |

FOREIGN PATENT DOCUMENTS

| CN | 102530827 A | 7/2012 |
| EP | 1306350 A2 | 5/2003 |
| WO | 2001073934 A1 | 10/2001 |

OTHER PUBLICATIONS

First Office Action dated Feb. 11, 2018 in counterpart Chinese Application Serial No. 201610683145.
Non-Final Office Action issued in U.S. Appl. No. 14/818,086 dated Feb. 22, 2018.
Final Office Action issued in U.S. Appl. No. 14/818,086 dated Jul. 27, 2018.
Second Office Action issued in CN Application Serial No. 201610683145 dated Feb. 1, 2019.

(Continued)

*Primary Examiner* — Jianchun Qin
(74) *Attorney, Agent, or Firm* — Brian J. Colandreo; Michael T. Abramson; Holland & Knight LLP

(57) ABSTRACT

An apparatus is provided. The apparatus includes a bidirectional comb drive actuator. The apparatus may also include a cantilever. The cantilever includes a first end connected to the bidirectional comb drive actuator and a second end connected to an inner frame. In addition, the cantilever may include first and second conductive layers for routing electrical signals. Embodiments of the disclosed apparatuses, which may include multi-dimensional actuators, allow for an increased number of electrical signals to be routed to the actuators. Moreover, the disclosed apparatuses allow for actuation multiple directions, which may provide for increased control, precision, and flexibility of movement. Accordingly, the disclosed embodiments provide significant benefits with regard to optical image stabilization and autofocus capabilities, for example in size- and power-constrained environments.

5 Claims, 10 Drawing Sheets

(56) References Cited

OTHER PUBLICATIONS

Non-Final Office Action issued in U.S. Appl. No. 16/252,091 dated Nov. 29, 2019.
Final Office Action issued in related U.S. Appl. No. 16/252,091 dated Apr. 16, 2020.
Non-Final Office Action issued in related U.S. Appl. No. 16/252,091 dated Sep. 1, 2020.

* cited by examiner

MULTI-DIRECTIONAL ACTUATOR

RELATED CASES

This application is a divisional of U.S. application Ser. No. 14/818,086, filed on Aug. 4, 2015, entitled "Multi-Directional Actuator", the contents of which are herein incorporated by reference in its entirety.

TECHNICAL FIELD

This disclosure relates to actuators in general, and in particular, to micro-electro-mechanical-system (MEMS) actuators configured to move a device.

BACKGROUND

Actuators may be used to convert electronic signals into mechanical motion. In many applications, such as, for example, portable electronic devices, miniature cameras, optical telecommunications components, and medical instruments, it may be beneficial for miniature actuators to fit within the specific size, power, reliability, and cost constraints of the application.

MEMS is a miniaturization technology that uses processes such as photolithography and etching of silicon wafers to form highly precise mechanical structures with electronic functionality. MEMS actuators generally function in a similar fashion to conventional actuators but offer some beneficial features over conventional actuators, and are formed using MEMS processes.

In some applications, such as moving an image sensor in a camera for automatic focusing (AF) or optical image stabilization (OIS), an actuator may be used to move an optoelectronic device that has a number of electrical inputs and outputs. For example, European patent No. EP 0253375, entitled "Two-dimensional piezoelectric actuator," by Fukada et al., teaches a design for a two-dimensional actuator that can be used to move an image sensor in a plane. The actuator taught by Fukada, however, is large and unamenable to space-constrained applications. For example, Fukuda's actuator may be used in large, stand-alone digital cameras, but not in miniature cell phone cameras, due to the associated space constraints.

Unlike conventional piezoelectric actuators, MEMS actuators may be used to, for example, move or position certain passive components within miniature cell phone cameras. By way of example, U.S. Pat. No. 8,604,663, entitled "Motion controlled actuator," by Roman Gutierrez et al., and U.S. Patent Application No. 2013/0077945 A1, entitled "Mems-based optical image stabilization," by Xiaolei Liu et al., teach MEMS actuators for moving a lens in a miniature camera (e.g., for use in a cell phone).

Neither of these MEMS actuators is able to move an optoelectronic device that has a number of electrical inputs and outputs. In addition, both of these MEMS actuators utilize deployment mechanisms that add complexity, size, and cost. Furthermore, conventional MEMS actuators are limited in the number of electrical signals that may be routed thereto, typically due to the limited number of physical connections to the MEMS actuators. This limits the degree and type of movement that conventional MEMS actuators are able to achieve with respect to the passive components, and hence limits the overall effectiveness of conventional MEMS actuators.

BRIEF SUMMARY OF THE DISCLOSURE

The present disclosure is generally directed to actuators and related apparatuses. By way of example, such actuators may include bi-directional or multi-directional MEMS actuators for moving or positioning a device, such as an image sensor in a camera. Various embodiments of actuators disclosed herein make use of MEMS comb drives and processes to achieve a high level of miniaturization, precision, power efficiency, and flexibility in terms of movement. Accordingly, the actuators of the present disclosure are highly suitable to, for example, provide optical image stabilization and auto-focus capabilities for cameras in space-constrained environments, such as within smartphones, and the like.

According to various embodiments of the disclosure, an apparatus includes a bidirectional comb drive actuator and a cantilever having first and second conductive layers for routing electrical signals. The cantilever includes a first end connected to the bidirectional comb drive actuator, a second end connected to an inner frame, and first and second conductive layers. The bidirectional comb drive actuator, in one embodiment, includes first and second frame pieces, and first and second comb drives. In one example implementation of the apparatus, the first and second comb drives each include first and second comb finger arrays. The first comb finger array of the first comb drive may be connected to the second frame piece. The second comb finger array of the first comb drive may be connected to the first frame piece. The first comb finger array of the second comb drive may be connected to the first frame piece. The second comb finger array of the second comb drive is connected to the second frame piece. The first comb finger array of the first comb drive and the second comb finger array of the second comb drive, in one instance, are electrically coupled to a first potential. Further, the second comb finger array of the first comb drive is electrically coupled to a second potential. In addition, the first comb finger array of the second comb drive is electrically coupled to a third potential.

In one case, the first conductive layer of the cantilever is electrically coupled to the second potential, and the second conductive layer of the cantilever is electrically coupled to the third potential. The first conductive layer may be electrically isolated from the second conductive layer. Moreover, in one embodiment of the actuator the first conductive layer routes a first of the electrical signals to the bidirectional comb drive actuator and the second conductive layer routes a second of the electrical signals to the bidirectional comb drive actuator.

The bidirectional comb drive actuator, in another embodiment, includes two or more comb drives. Each of the comb drives includes first and second curved comb finger arrays. In this embodiment, the bidirectional comb drive actuator also includes an inner flexure connected to the first end one of the cantilevers and a pair of outer flexures on opposite sides of the inner flexure.

Further embodiments of the disclosure include a multi-directional actuator for moving a device. The multi-directional actuator includes one or more bidirectional comb drive actuators. Each of the bidirectional comb drive actuators includes two or more comb drives and first and second frame pieces. Each of the comb drives include first and second comb finger arrays. The first comb finger array of the first comb drive and the second comb finger array of the second comb drive are connected to the second frame piece. The second comb finger array of the first comb drive and the first comb finger array of the second comb drive are connected to the first frame piece.

In one embodiment, the multidirectional actuator also includes an inner frame connected to the bidirectional comb drive actuators by one or more cantilevers. Each of the cantilevers in this embodiment includes routing for a first electrical signal, and at least one of the cantilevers further includes routing for a second electrical signal. The multi-directional actuator may also include an outer frame connected to the inner frame by one or more spring elements. The bidirectional comb drive actuators, in such an example, are attached to a central anchor that may be mechanically fixed with respect to the outer frame. In one implementation, a platform mechanically fixes the central anchor with respect to the outer frame. By way of example, the platform may be an optoelectronic device or an image sensor.

In one embodiment of the multi-directional actuator, for each of the bidirectional comb drive actuators, the cantilevers electrically couple the bidirectional comb drive actuator to one or more contact pads disposed on the inner frame. Moreover, the spring elements electrically couple the contact pads disposed on the inner frame to one or more corresponding contact pads disposed on the outer frame.

Additional embodiments of the disclosure include methods for moving a device using an actuator. One such method includes connecting an inner frame to one or more bidirectional comb drive actuators using a cantilever for each of the bidirectional comb drive actuators. The method also includes coupling electrical signals to the bidirectional comb drive actuators using the cantilevers. Moreover, the method includes generating a controlled force using the bidirectional comb drive actuators and the electrical signals. The bidirectional comb drive actuators may include flexures. In such example implementations, for one or more of the bidirectional comb drive actuators, coupling the electrical signals to the bidirectional comb drive actuators includes using the flexures to route the electrical signals.

In some of the disclosed methods, each of the bidirectional comb drive actuators include first and second comb drives. The first and second comb drives may each include first and second comb finger arrays. Some such methods may also include moving, in response to applying the controlled force, either the second comb finger array of the first comb drive and the first comb finger array of the second comb drive, or the first comb finger array of the first comb drive and the second comb finger array of the second comb drive.

The controlled force, in one case, effects movement in a plane, and this movement includes linear movement. In other cases the movement includes rotational movement. Embodiments of the disclosed methods also include applying the controlled force between an outer frame and an inner frame, and mechanically fixing an anchor with respect to the outer frame. In such embodiments, the controlled force is applied to the anchor.

BRIEF DESCRIPTION OF THE DRAWINGS

The present disclosure, in accordance with one or more various embodiments, is described in detail with reference to the following figures.

Figure 1:
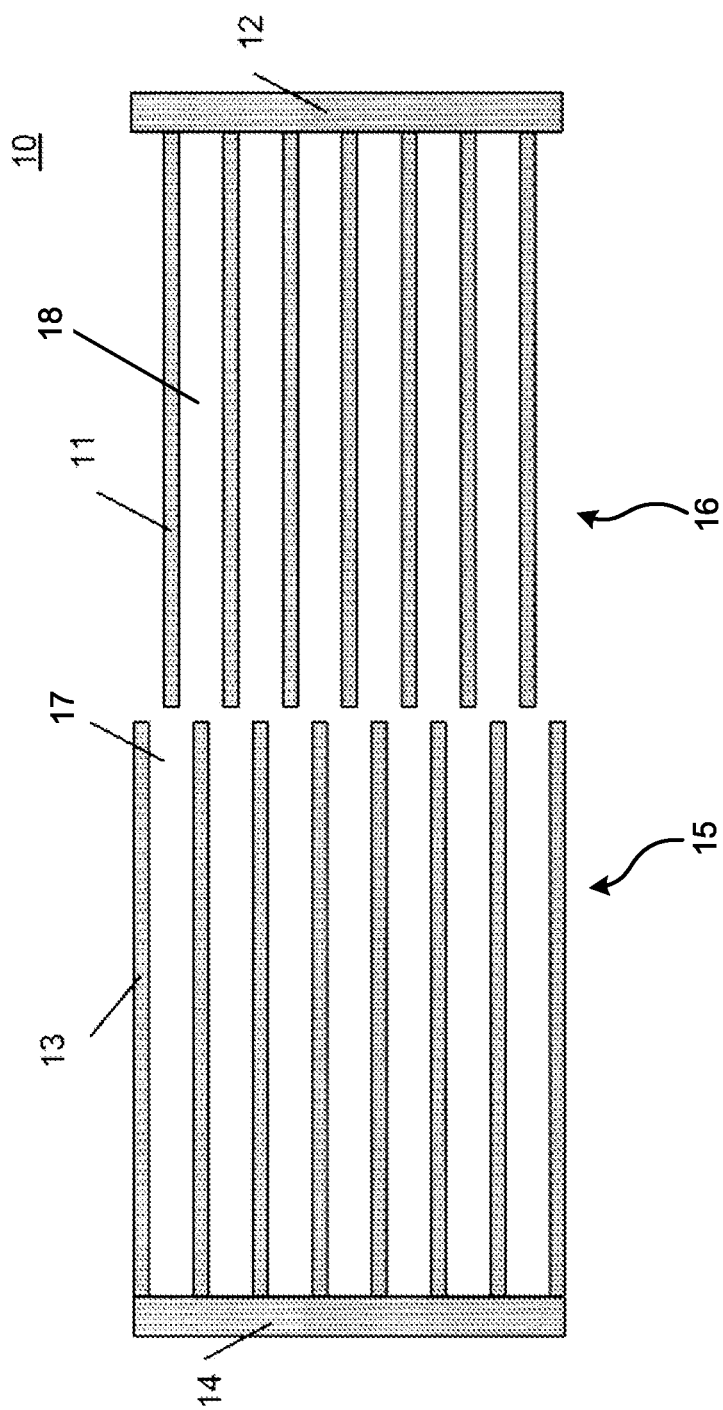
FIG. 1 illustrates a plan view of a comb drive in accordance with example embodiments of the present disclosure.

The figures are provided for purposes of illustration only and merely depict typical or example embodiments of the disclosure. The figures are described in greater detail in the description and examples below to facilitate the reader's understanding of the disclosed technology, and are not intended to be exhaustive or to limit the disclosure to the precise form disclosed. It should be understood that the disclosure may be practiced with modification or alteration, and that such modifications and alterations are covered by one or more of the claims, and that the disclosure may be limited only by the claims and the equivalents thereof. For clarity and ease of illustration, these figures are not necessarily made to scale.

DETAILED DESCRIPTION

The present disclosure is directed to various embodiments of systems, methods, and apparatuses that include a MEMS actuator for moving a device that may include electrical connections. The details of some example embodiments of the systems, methods, and apparatuses of the present disclosure are set forth in the description below. Other features, objects, and advantages of the disclosure will be apparent to one of skill in the art upon examination of the present description, figures, examples, and claims. It is intended that all such additional systems, methods, apparatus, features, and advantages, etc., including modifications thereto, be included within this description, be within the scope of the present disclosure, and be protected by one or more of the accompanying claims.

In accordance with embodiments further described herein, various actuators are provided. These actuators, including, in some instances, the packaging thereof, may be used in a range of different environments, for example, portable electronic devices, miniature cameras, optical telecommunications components, and medical instruments. The features of the disclosed actuators generally allow for a high degree of precision and variability in moving or positioning a device in multiple degrees of freedom and multiple directions within these various environments, while achieving low power consumption and being highly compact.

By way of example, in some embodiments, one aspect of such features of the disclosed actuators includes that the actuators allow for an increased number of electrical signals to be routed to the actuators. Another aspect of such example features is that some embodiments of the disclosed actuators include comb drives arranged in a back-to-back structure that allows the actuators to effect movement in multiple directions. These features, in turn, may allow for increased control, precision, and flexibility over the degrees of freedom and number of directions in which the actuators may effect force or movement. Accordingly, the disclosed embodiments provide significant benefits with regard to optical image stabilization and auto-focus capabilities over conventional solutions, for example. Having provided a high-level overview of some aspects of the disclosed actuators, some examples of basic building blocks thereof will now be described.

Referring now to the figures, FIG. 1 illustrates a plan view of comb drive 10, in accordance with example embodiments of the present disclosure. Comb drive 10 may be an electrostatic comb drive. Comb drive 10 may include comb finger arrays 15 and 16, which, by way of example, may be fabricated on silicon using MEMS processes such as photolithography and etching.

As shown in FIG. 1, comb finger array 16 includes comb fingers 11 and spine 12 that connects comb fingers 11 to one another. Similarly, comb finger array 15 includes comb fingers 13 and spine 14 that connects comb fingers 13 to one another. Comb fingers 11 and 13 may be inter-digitated, such that comb fingers 11 substantially line up with spaces 17 between comb fingers 13, and comb fingers 13 substantially line up with the spaces 18 between comb fingers 13. Comb fingers 11 and 13, spines 12 and 14, and comb finger arrays 15 and 16 are illustrated in FIG. 1 as having particular shapes, proportions, spatial arrangements, etc., but one of skill in the art will recognize additional shapes, proportions, spatial arrangements, and so on, that may be utilized within the scope and spirit of the present disclosure. For example, while FIG. 1 illustrates comb fingers 11 and 13 without any overlap, comb fingers may be fabricated so that there is overlap.

In any case, when a voltage, charge, or electrical potential tension is applied between comb fingers 11 and 13 (or between comb finger arrays 15 and 16)—i.e., comb fingers 11 and/or 13, or comb finger arrays 15 and/or 16, are electrified—comb finger arrays 15 and 16 may be attracted to each other with an electrostatic force proportional to, by way of example, the square of the applied voltage (which may be positive or negative as between comb finger arrays 15 and 16). This electrostatic force may cause comb finger arrays 15 and 16 to move toward one another, while a spring restoring force may be used to separate comb finger arrays 15 and 16 from one another. Additionally, the speed with which comb finger arrays 15 and 16 move with respect to one another may depend on the electrostatic force applied. Typically, the design of comb drive 10 is such that comb fingers 11 and 13 may be pulled into an increased overlapping state by the electrostatic force between comb finger arrays 15 and 16 or pulled into a decreased overlapping state by the spring restoring force. When comb finger arrays 15 and 16 overlap, comb fingers 11 reside at least partially within space 17 of comb finger array 15, and comb fingers 13 reside at least partially within space 18 of comb finger array 16.

The ratio of comb finger width to depth may be chosen to avoid comb fingers 11 bending into comb fingers 13 when comb fingers 11 and 13 are overlapped. For example, comb fingers 11 and/or 13 may be about 6 micrometers wide by about 150 micrometers long. In general, comb fingers 11 and/or 13 may be between about 1 and 10 micrometers wide and about 20 and 500 micrometers long. The distance between two adjacent comb fingers 11 (or 13) subtracted by the width of one of the corresponding comb fingers 13 (or 11) sets the total gap between comb fingers 11 and 13 when brought into overlap by the electrostatic force. In some instances, it may be desirable for this total gap to be relatively small, in order to increase the electrostatic force between comb fingers 11 and comb fingers 13. In addition, it may also be desirable for the total gap to be large enough to deal with variations in the width of comb fingers 11 and/or 13 that arise from process variations. For example, the total gap may be about 1 to 5 micrometers or larger. In various instances, however, the total gap may be made smaller or larger, as needed. Generally, comb drive 10 may be fabricated with a total gap that is between a minimum and a maximum value, but during motion, the total gap may vary between the minimum and maximum values. In one particular implementation of the disclosure, the total gap between comb fingers 11 and 13 ranges from a minimum of about 1.5 micrometers to a maximum of about 4 micrometers, though narrower and wider ranges are possible.

The depth of comb fingers 11 and 13 may generally be limited by the particular fabrication process used, and specifically by the etching aspect ratio of that process—this is because it may generally be desirable for the width of comb fingers 11 and 13 on the top to be substantially the same as the width of comb fingers 11 and 13 on the bottom. The depth aspect of comb fingers 11 and 13 is not illustrated in FIG. 1, but would extend into or out of the page. For example, comb fingers 11 and 13 may be about 50 to 250 micrometers in depth. Spaces 17 and 18 may either be etched away entirely, or may be removed by other methods known in the art of MEMS micromachining. Other variations of comb drive 10's length, shape, arrangement, and configuration may be used to achieve differing degrees, directions, and/or precision of controlled forces, various size footprints, and other characteristics, as will be appreciated by one of skill in the art upon studying the present disclosure.

Figure 2A:
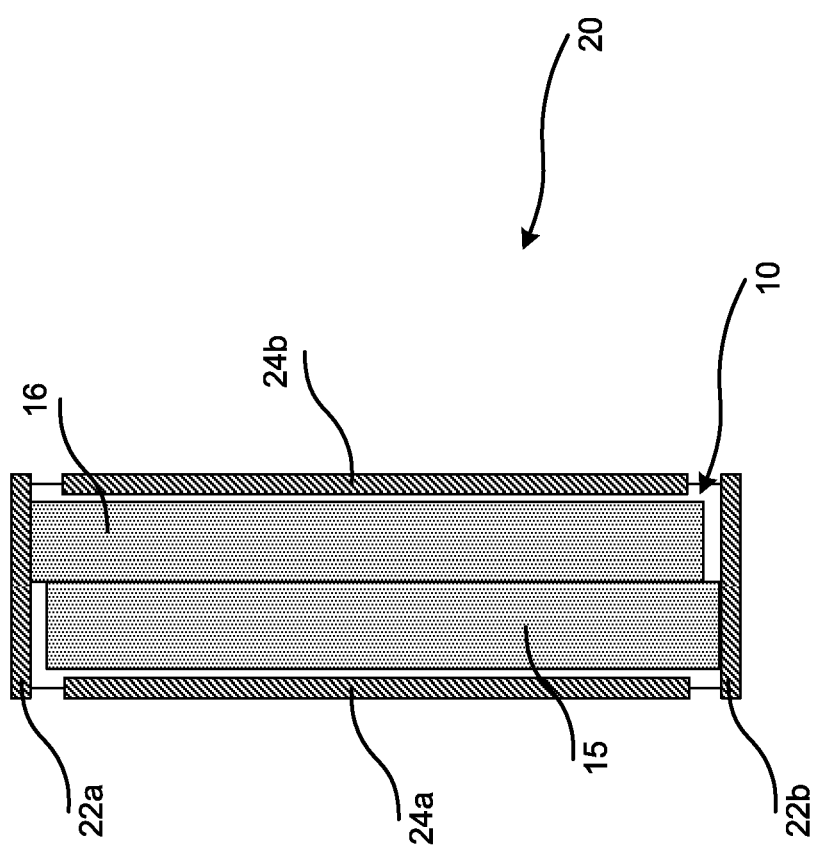
FIG. 2A illustrates a plan view of a comb drive actuator in accordance with example embodiments of the present disclosure.

FIG. 2A illustrates a plan view of comb drive actuator 20 in accordance with example embodiments of the present disclosure. As shown in FIG. 2A, comb drive actuator 20 includes comb drive 10. Some details of comb drive 10 are omitted here for simplicity, but are illustrated in FIG. 1, and will be clear to one of skill in the art upon studying the present disclosure. Referring again to FIG. 2A, comb drive 10 includes comb finger arrays 15 and 16. One embodiment of comb drive actuator 20 also includes first and second frame pieces 22a/b, and first and second flexures 24a/b. Although not shown in detail in FIG. 2A, to provide context with respect to first and second comb finger arrays 15 and 16, it will be understood that, as shown in FIG. 1, comb fingers 11 and 13 extend substantially from left to right, and vice versa, in comb finger arrays 15 and 16. Moreover, although not explicitly shown in FIG. 2A, it will be understood that spines 12 and 14 run substantially vertically from first frame piece 22a to second frame piece 22b (i.e., substantially in parallel with flexures 24a/b depicted in FIG. 2A). Spine 14 of comb finger array 15 may be attached to second frame piece 22b, while spine 12 of comb finger array 16 may be attached to first frame piece 22a. When spine 14 or of comb finger array 15 or 16 is attached to either of first or second frame piece 22a/b, it may be said that comb finger array 15 or 16 is connected to first or second frame piece 22a/b.

Configured as such, when comb finger arrays 15 and 16 are attracted to or repelled from one another such that movement occurs, first and second frame pieces 22a/b may likewise be caused to move (e.g., from left to right or vice versa in FIG. 2A). For example, assuming comb finger array 15 is fixed relative to comb finger array 16, if a voltage is applied to comb finger array 16 relative to comb finger array 15 (or vice versa), comb finger array 16 may be attracted to comb finger array 15, such that comb finger array 16 may be induced to move toward comb finger array 15. This in turn may cause first frame piece 22a to move toward the side of comb drive 10 where comb finger array 15 resides (i.e., to the left in the plane of comb drive actuator 20 in FIG. 2A).

In another example, assuming comb finger array 16 is fixed relative to comb finger array 15, if a voltage is applied to comb finger array 15 relative to comb finger array 16 (or vice versa), comb finger array 15 may be attracted to comb finger array 16, such that comb finger array 15 may be induced to move toward comb finger array 16. This in turn may cause second frame piece 22b to move toward the side of comb drive 10 where comb finger array 16 resides (i.e., to the right in FIG. 2A). One of skill in the art will appreciate, upon studying the present disclosure, that electrostatic forces and other motive forces may be developed between comb finger arrays 15 and 16 by methods other than applying voltage, without departing from the spirit of the present disclosure. For example, charge may be applied to comb finger arrays 15 and 16.

The movement of first and/or second frame pieces 22a/b and of comb finger arrays 15 and/or 16 may be directed and/or controlled to some extent by first and second flexures 24a/b. Specifically, first and second flexures 24a/b may be substantially flexible or soft in the horizontal direction (i.e., in the direction of comb fingers 11 and 13) and may be substantially stiff or rigid in the vertical direction (i.e., in the direction of spines 12 and 14). In this example configuration of flexibility and rigidity, first and second flexures 24a/b allow comb drive 10 to effect movement horizontally (i.e., in the left/right, east/west, direction in FIG. 2A) while substantially restricting the movement in the vertical direction (i.e., in the top/bottom, north/south, direction in FIG. 2A). First and second flexures 24a/b may be omitted in some instances, and, in other instances, may be replaced by various motion control means known in the art and/or appreciated in light of the present disclosure.

As mentioned above, one embodiment of comb drive actuator 20 includes first and second flexures 24a/b that direct the motion of comb finger arrays 15 and 16 to be substantially parallel to the length of comb fingers 11 and 13 (i.e., east/west in FIG. 2A). The arrangement of first and second flexures 24a/b may be referred to, in some cases, as a double parallel flexure motion control. Such a double parallel flexure motion control may produce nearly linear motion, but there may be a slight run-out known as arcuate motion. Nevertheless, the gap on one side of comb fingers 11 may not be equal to the gap on the other side of comb fingers 11, and this may be used advantageously in design to correct for effects such as arcuate motion of a double parallel flexure motion control.

Referring again to one embodiment of comb drive actuator 20, first and second flexures 24a/b form a motion control that is a double parallel flexure. Nevertheless, as alluded to above, the motion control may be implemented using other structures that serve to control the motion of first and second frame pieces 22a/b with respect to one another. In the illustrated embodiment, first and second flexures 24a/b include thinner portions on the respective ends thereof. These thinner portions may allow bending when, for example, there is a translation of first frame piece 22a with respect to second frame piece 22b or vice versa (i.e., in the east/west direction in FIG. 2A).

In terms of example dimensions, the thicker portion of first and second flexures 24a/b may be about 10 to 50 micrometers wide, and the thinner portions may be about 1 to 10 micrometers wide. In various embodiments, any number and type of motion controls may be used as desired to control or limit the motion of comb finger arrays 15 and/or 16. Controlled motion may enhance the overall precision with which comb drive actuator 20 effects movement, or positions a device such as, for example, and image sensor in a smartphone camera. In addition, controlled motion aids in avoiding a situation in which comb fingers 11 and 13 snap together. For example, controlled motion may generally be effected by creating a lower level of stiffness in desired direction of motion of comb fingers 15 and 16, while creating a higher level of stiffness in the direction orthogonal to the motion of comb fingers 15 and 16 in the plane of comb drive actuator 20. By way of example, this may be done using a double parallel flexure type motion control, as described in further detail herein, e.g., in connection with at least FIGS. 2A and 2B.

With respect to various example implementations of comb drive actuator 20, it may be typical that first frame piece 22a is mechanically fixed with respect to second frame piece 22b, or vice versa, for example, through first and second flexures 24a and 24b. In this manner, when comb fingers 11 and 13 (or comb finger arrays 15 and 16) are electrified (e.g., as described above), one of first frame piece 22a and second frame piece 22b is moved from an initial position while the other remains fixed. Once comb fingers 11 and 13 are no longer electrified, whichever of first or second frame piece 22a or 22b moved from the initial position, returns thereto. In this case, the spring restoring force is provided by first and second flexures 24a and 24b. As such, comb drive actuator 20 may be referred to as a unidirectional comb drive actuator.

In terms of dimensions, spines 12 and 14 and first and second frame pieces 22a/b, in various instances, may be designed wide and deep enough to be rigid and not flex substantially under an applied range of electrostatic or other motive forces. For example, spines 12 and 14 may be about 20 to 100 micrometers wide and about 50 to 250 micrometers deep, and first and second frame pieces 22a/b may be larger than about 50 micrometers wide and about 50 to 250 micrometers deep.

Figure 2B:
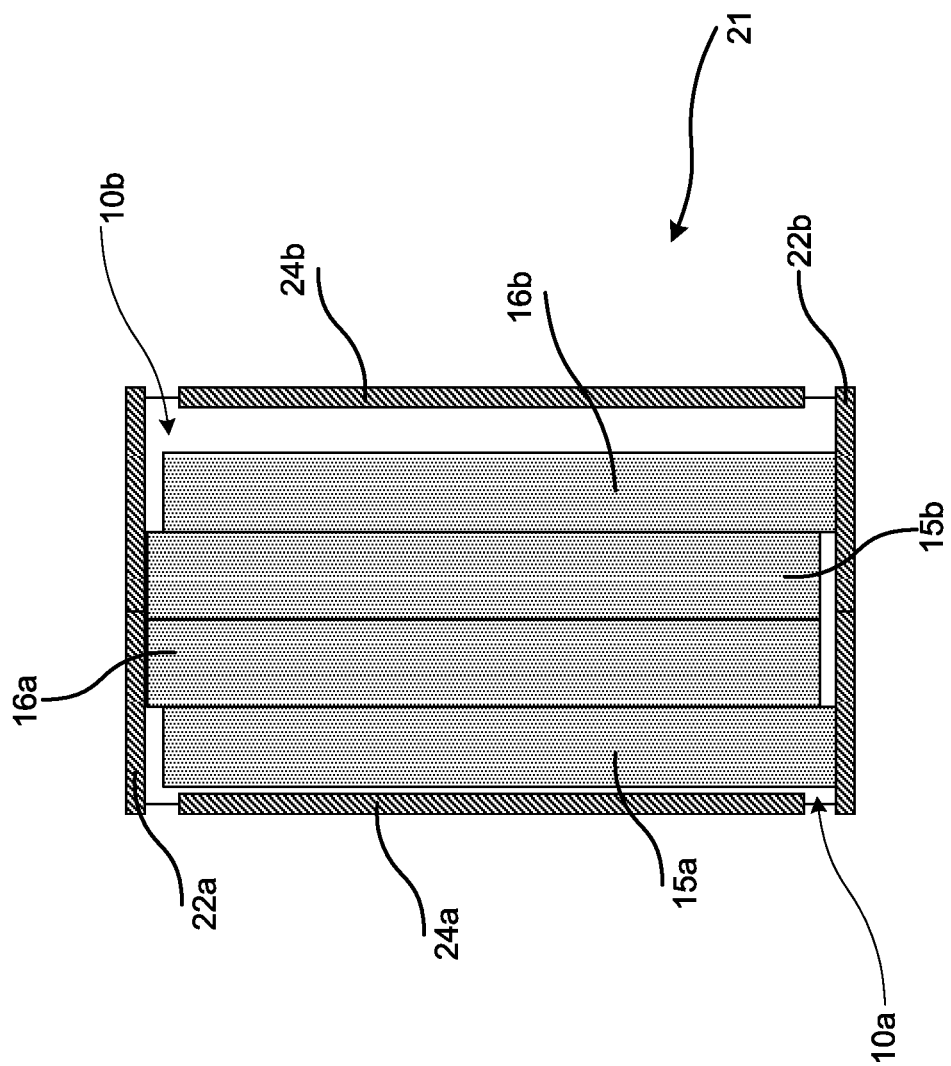
FIG. 2B illustrates a plan view of a bidirectional comb drive actuator in accordance with example embodiments of the present disclosure.

FIG. 2B illustrates a plan view of bidirectional comb drive actuator 21 in accordance with example embodiments of the present disclosure. As an initial matter, it will be noted that, throughout the present disclosure, like-numbered elements as between the various figures may generally be substantially similar in nature, and letters—e.g., a, b, c, etc.—may be used to denote various instances of these elements. Any exceptions to this generality will either be explained herein, and/or will be apparent to one of ordinary skill in the art upon studying the present disclosure.

As shown in FIG. 2B, one embodiment of bidirectional comb drive actuator 21 includes comb drives 10a/b. Additional embodiments may include first and second frame pieces 22a/b and/or first and second flexures 24a/b. Some details of comb drives 10a/b are illustrated in FIG. 1 with regard to comb drive 10. Although not all of the details of each of comb drives 10a/b are shown in FIG. 2B, in the illustrated embodiment (and various related embodiments), it will be understood that, for example, spine 12 (shown in FIG. 1) of comb drive 10a is connected to first frame piece 22a and spine 14 (shown in FIG. 1) of comb drive 10a is connected to second frame piece 22b. It will further be understood that, in this particular embodiment, spine 12 of comb drive 10b is connected to second frame piece 22b and spine 14 of comb drive 10b is connected to first frame piece 22a. In other words, comb finger arrays 15a and 16b are connected to second frame piece 22b, and comb finger arrays 15b and 16a are connected to first frame piece 22a.

In this manner, and in this example implementation of bidirectional comb drive actuator 21, when comb finger arrays 15*a* and 16*a* are electrified (e.g., in the manner described above), a motive force is applied with respect to first and second frame pieces 22*a/b* such that either first or second frame piece 22*a/b* moves substantially horizontally from an initial position with respect to second or first frame piece 22*b/a*, depending, by way of illustration, on which of first and second frame piece 22*a/b* is mechanically fixed. Once comb finger arrays 15*a* and 16*a* are no longer electrified, first or second frame pieces 22*a/b* move back to the initial state due to the spring restoring force of first and second flexures 24*a* and 24*b*. In other words, comb drive 10*a* may effect unidirectional movement in a similar fashion as described above with respect to comb drive 10. Further to this implementation, bidirectional movement is achieved when, in addition to the movement resulting from comb drive 10*a*—e.g., in a first direction—comb drive 10*b* similarly achieves movement—e.g., in a second, substantially opposite direction—when comb finger arrays 15*b* and 16*b* are electrified.

In one example implementation, comb finger arrays 15*a* and 16*b* may be tied to a common potential (e.g., ground or some other positive or negative voltage) that acts as a reference for comb finger arrays 16*a* and 15*b*. Given this reference, comb finger arrays 16*a* and 15*b* may be electrified, by way of illustration, depending on the direction of movement required. This may entail applying a positive or negative voltage (e.g., relative to ground or other common reference applied to comb finger arrays 15*a* and 16*b*) of a magnitude to comb finger array 16*a*, hence causing comb finger array 16*a* to be attracted to comb finger array 15*a*. Assuming second frame piece 22*b* is fixed, this attraction would, in this instance, cause first frame piece 22*a* to move to the left in FIG. 2B. Further to this illustration, electrifying comb finger array 15*b* may entail applying thereto a positive or negative voltage (again, e.g., relative to the common reference applied to comb finger arrays 15*a* and 16*b*) of the same magnitude as the voltage applied to comb finger array 16*a*, hence causing comb finger array 15*b* to be attracted to comb finger array 16*b*. This attraction would, in this instance, cause first frame piece 22*a* to move to the right in FIG. 2B, assuming again that second frame piece 22*b* is fixed.

It will be appreciated, however, that in another embodiment, comb finger arrays 16*a* and 15*b* may be tied to a common potential that acts as a reference for comb finger arrays 15*a* and 16*b*. Given this reference, comb finger arrays 15*a* and 16*b* may be electrified to effect bidirectional movement of first frame piece 22*a* with respect to second frame piece 22*b* or vice versa, depending on which of first or second frame pieces 22*a/b* is fixed (in a fashion similar to that described above). In further embodiments, the motive force developed by comb drive 10*a* may differ from the motive force developed by comb drive 10*b*. For example, voltages of different magnitudes may be applied to comb finger arrays 16*a* and 15*b*, or whichever comb finger arrays are not tied to a common potential. It will be understood that, in some instances, for comb finger arrays 16*a* and 15*b* to maintain different voltage levels, or electrostatic or charge states, comb finger arrays 16*a* and 15*b* may be electrically separate (or isolated) from one another.

In various embodiments, spines 12 and 14 of comb finger arrays 15*a/b* and 16*a/b* may be attached to first and/or second frame pieces 22*a/b* in different configurations to achieve different purposes. For example, in one embodiment, for each of comb drives 10 of a set of comb drives, spine 12 is attached to first frame piece 22*a* while spine 14 is attached to second frame piece 22*b*. Such a configuration results in a parallel cascade of comb drives 10 that may increase the electrostatic force ultimately applied to first and second frame pieces 22*a/b*. In another example embodiment, comb drives 10 in a set of comb drives are arranged in a back-to-back fashion to achieve bi-directional movement, as described above. While this back-to-back arrangement was described above with regard comb drives 10*a/b*—i.e., two comb drives 10—any larger number of comb drives may be used to achieve bi-directional movement.

Figure 2C:
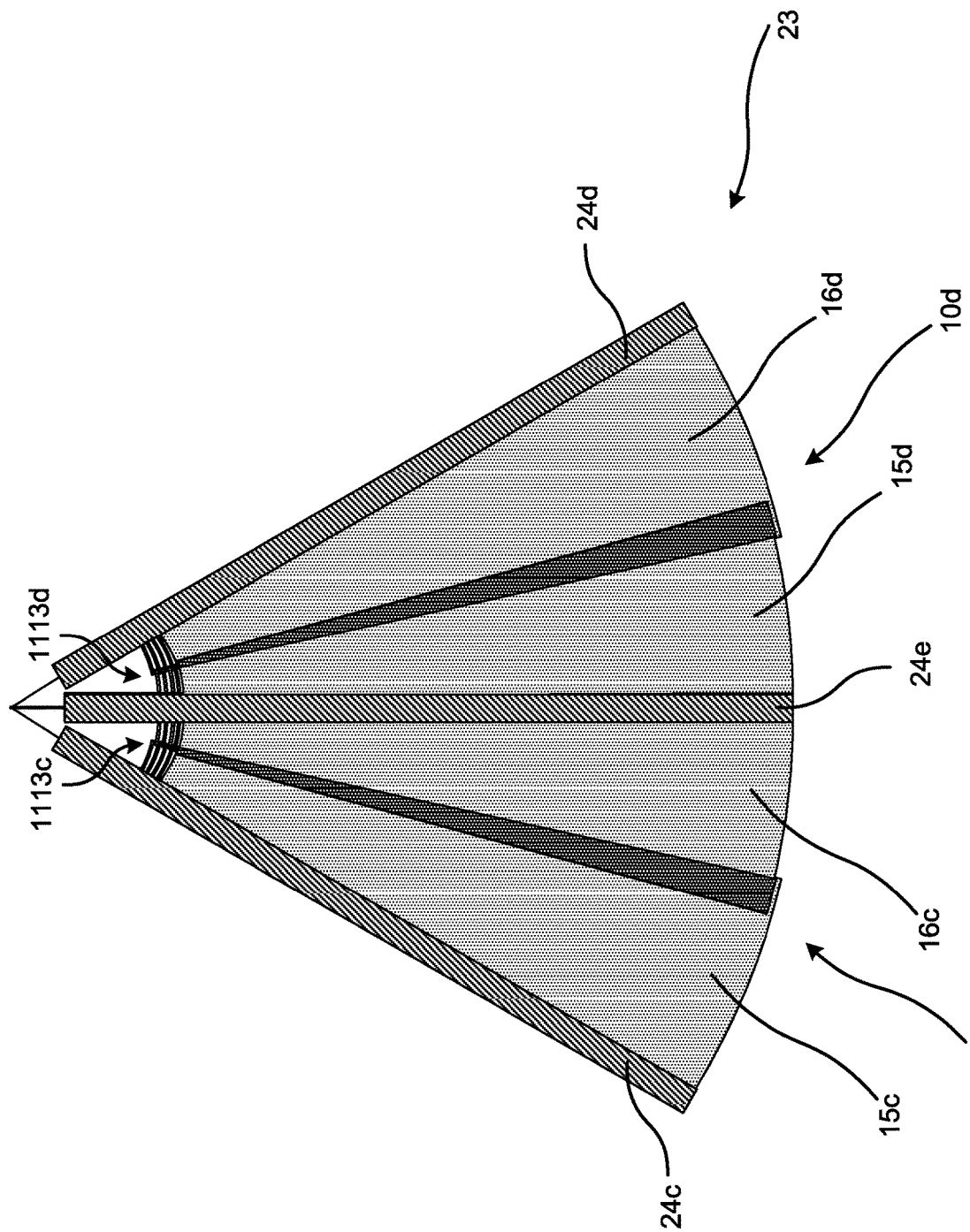
FIG. 2C illustrates a plan view of a bidirectional comb drive actuator in accordance with example embodiments of the present disclosure.

FIG. 2C illustrates a plan view of bidirectional comb drive actuator 23 in accordance with example embodiments of the present disclosure. Bidirectional comb drive actuator 23 may be considered somewhat similar in nature to bidirectional comb drive actuator 21, but there are some distinguishing features. For example, bidirectional comb drive actuator 23 includes comb drives 10*c/d*, and in some embodiments, includes outer flexures 24*c/d* and inner flexure 24*e*. As shown, comb drives 10*c/d* may taper from a wider end (e.g., toward to the openings between outer flexures 24*c/d* and inner flexure 24*e*) to a narrower end (e.g., toward the juncture or pivot point of outer flexures 24*c/d* and inner flexure 24*e*). As further illustrated, each of outer flexures 24*c/d* and inner flexure 24*e* in this embodiment includes a relatively thin portion that extends from the pivot point.

In one instance, comb drive 10*c* includes comb finger arrays 15*c* and 16*c*, and comb drive 10*d* includes comb finger arrays 15*d* and 16*d*. Each of comb finger arrays 15*c/d* and 16*c/d* may include respective curved comb fingers 1113*c/d* that are substantially curved, for example, along an arc as illustrated at the wider end of comb drives 10*c/d*. Specifically, one implementation of curved comb fingers 1113*c/d* is shown in greater detail toward the narrower end of (or pivot point between) comb drives 10*c/d*. In one instance of the disclosure, zipper actuators may be placed near the pivot point and may be used in conjunction with comb drives 10*c/d* to increase the motive force between comb finger arrays 15*c* and 16*c* and/or 15*d* and 16*d*. In a fashion similar to bidirectional comb drive actuator 21 (described above), comb finger arrays 15*c/d* and 16*c/d* of bidirectional comb drive actuator 23 may be electrified to effect bidirectional movement.

Figure 5:
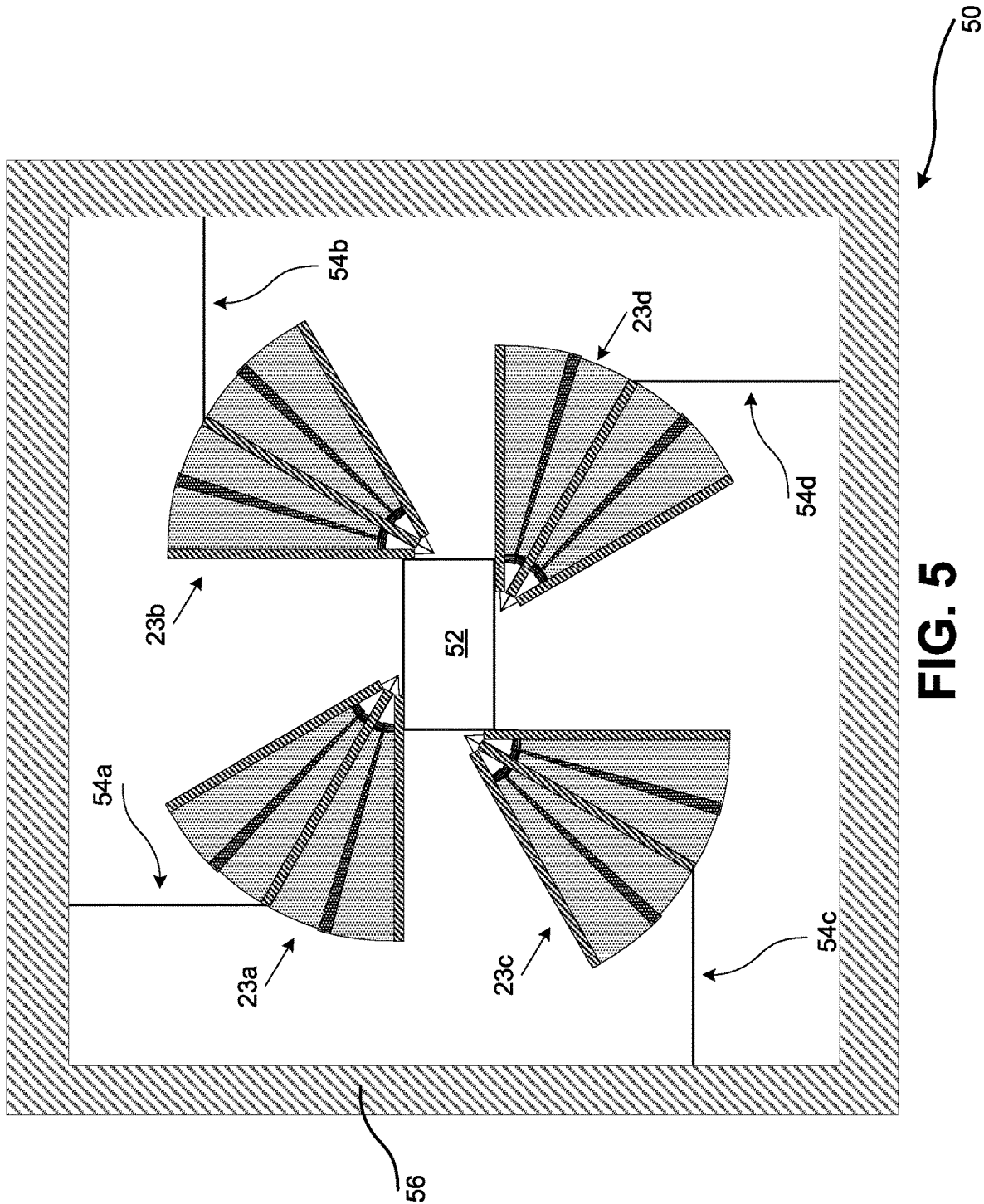
FIG. 5 illustrates a plan view of an actuator in accordance with example embodiments of the present disclosure.

With respect to bidirectional comb drive actuator 23, however, the resulting movement is substantially rotational. Rotational movement may be effective in avoiding arcuate motion, and may be converted to linear motion, for example using cantilevers (e.g., as shown in FIG. 5). In one example implementation of bidirectional comb drive actuator 23, if outer flexures 24*c/d* are made stiff, inner flexure 24*e* may be made flexible so that inner flexure 24*e* may bend along the relatively thin portion near the pivot point when comb finger arrays 15*c/d* and/or 16*c/d* are electrified. If, on the other hand, in another example implementation, outer flexures 24*c/d* are made flexible, inner flexure 24*e* may be made stiff so that outer flexures 24*c/d* may bend along the relatively thin portions near the pivot point when comb finger arrays 15*c/d* and/or 16*c/d* are electrified. Various additional modifications may be made to bidirectional comb drive actuator 23, as will be understood by one in the art upon studying the present disclosure.

Figure 3:
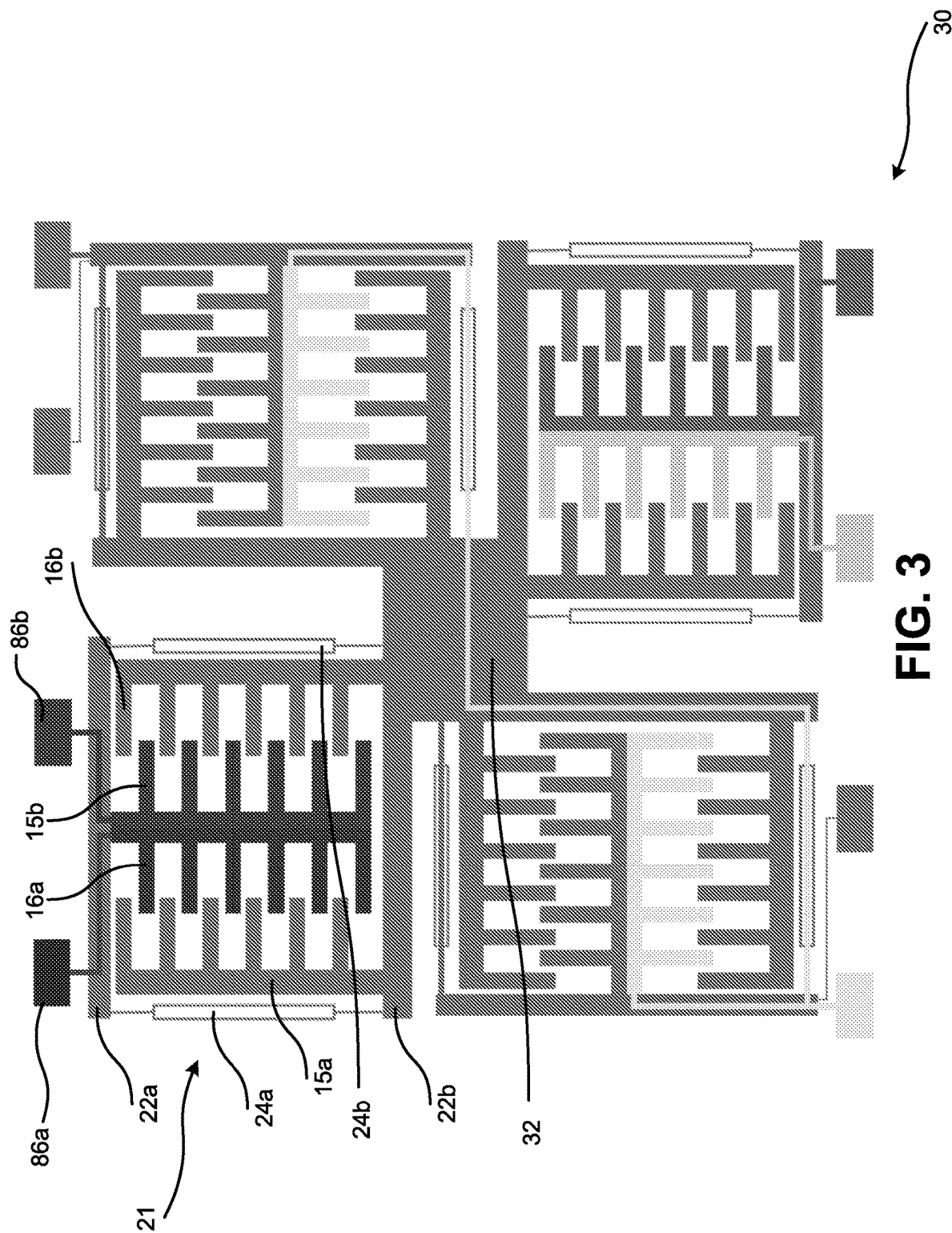
FIG. 3 illustrates a plan view of an actuator in accordance with example embodiments of the present disclosure.

FIG. 3 illustrates a plan view of apparatus 30 in accordance with example embodiments of the present disclosure. The embodiment of apparatus 30 illustrated in FIG. 3 includes four bidirectional comb drive actuators 21. In other example implementations, apparatus 30 may include any number of bidirectional comb drive actuators 21. Apparatus 30 may be, by way of example, a multi-dimensional actuator. For the most part, the numbered elements of FIG. 3 have been described in detail above with regard to FIGS. 1, 2A, and 2B, and the details of such description will not be repeated here. Nevertheless, additional aspects of these elements will be described with regard to FIG. 3 where appropriate. Additional elements of apparatus 30 will also be described.

For example, in addition to bidirectional comb drive actuators 21, apparatus 30 may also include anchor 32 and electrical contact pads 86a and 86b. Anchor 32 may be rigidly connected or attached to first and/or second frame pieces 22a/b of one or more bidirectional comb drive actuators 21, such that anchor 32 is mechanically fixed with respect thereto. Thus, for example, if first frame piece 22a is connected or attached to anchor 32, movement of second frame piece 22b relative to first frame piece 22a may also be considered movement relative to anchor 32. In this embodiment illustrated in FIG. 3, second frame piece 22b is connected or attached to anchor 32. For example, second frame piece 22b may be an integral part of anchor 32.

Electrical contact pads 86a and 86b are shown in FIG. 3 for conceptual purposes only, in order to provide context for some of the electrical routing aspects described in connection with apparatuses 30 and 40. In various embodiments, and as described further below with regard to FIG. 4A, each of electrical contact pads 86a and 86b may reside on inner frame 46 or outer frame 48 (see, e.g., electrical contact pads 82 and 84 in FIG. 4A). For example, electrical contact pads 86a and 86b may be implemented in a fashion similar to electrical contact pads 82 and/or 84. Electrical contact pads 86a and 86b, however, are presented only conceptually in FIG. 3. Therefore, for example, it should not be assumed that electrical contact pads 86a or 86b are mechanically fixed with respect to any of bidirectional comb drive actuators 21. Rather, as is described below with regard to FIG. 4A, electrical contact pads 86a and 86b (see, e.g., electrical contact pads 82 and 84 in FIG. 4A) may be routed to one or more of bidirectional comb drive actuators 21 through one or more cantilevers 44a-d. In this manner, electrical contact pads may be either fixed or free to move in various degrees of freedom with respect to bidirectional comb drive actuators 21 illustrated in FIG. 3, regardless of whether electrical contact pads 86a and 86 reside on inner frame 46, outer frame 48, or elsewhere.

In various embodiments of apparatus 30, the length, size, or proportion of the various bidirectional comb drive actuators 21 included in apparatus 30 may vary, for example to accommodate spatial constraints (e.g., to minimize or customize the footprint of apparatus 30). By way of illustration, a first bidirectional comb drive actuator 21 (e.g., in the upper left quadrant of apparatus 30) may be relatively long and narrow, while a second bidirectional comb drive actuator 21 (e.g., in the lower left quadrant) may be shorter and wider. As such, in the case wherein first and second bidirectional comb drive actuators 21 of this illustrative example are perpendicular to one another, the relative proportions may maximize the usage of allotted space. Other configurations, lengths, sizes, and proportions are possible and will be recognized by one of skill in the art upon studying the present disclosure. Moreover, further aspects of apparatus 30 will become clear when viewed in conjunction with the description of FIG. 4A, including, for example, how apparatus 30 may be used to achieve multidirectional movement.

Figure 4A:
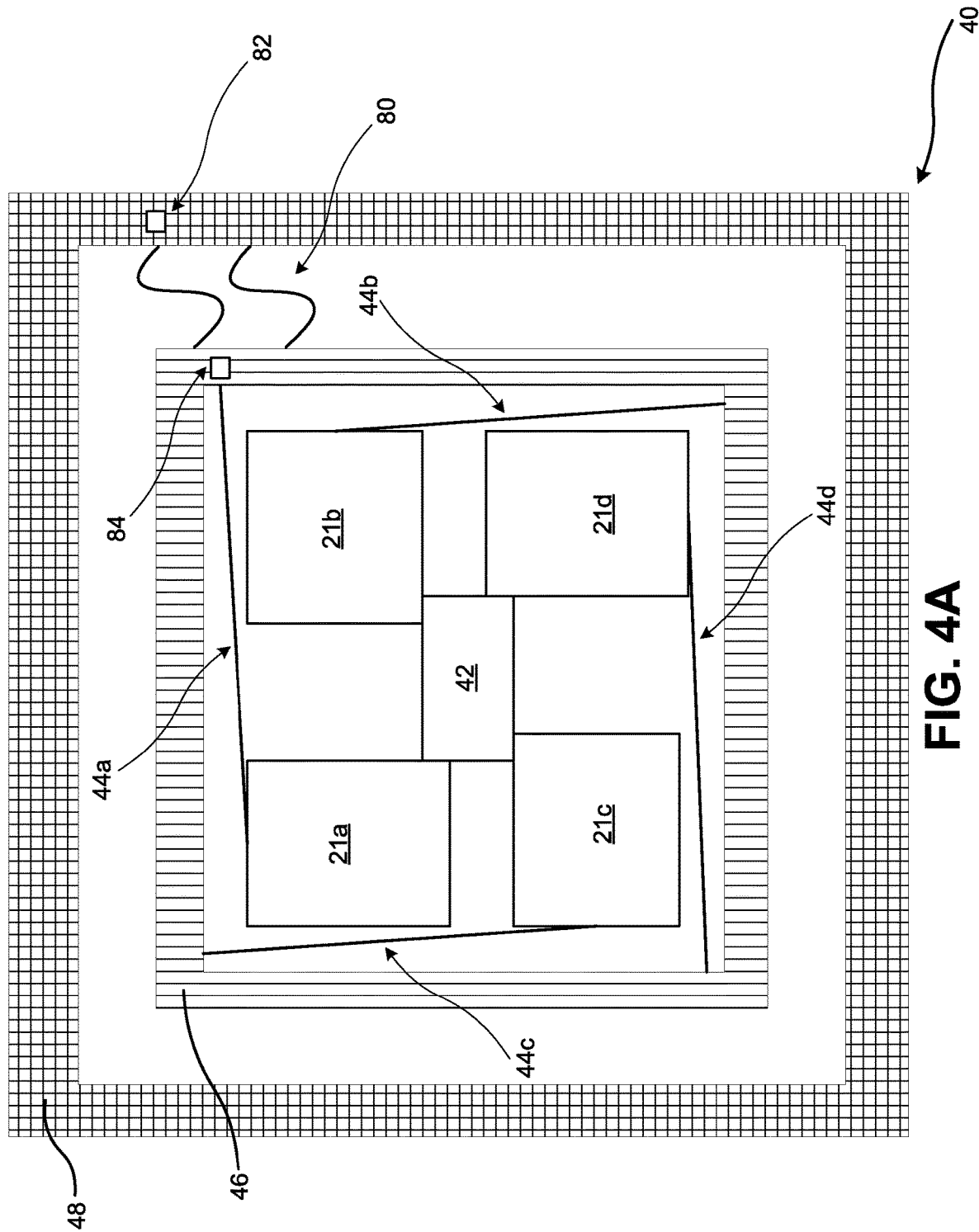
FIG. 4A illustrates a plan view of an actuator in accordance with example embodiments of the present disclosure.

FIG. 4A illustrates a plan view of apparatus 40 in accordance with example embodiments of the present disclosure.

Apparatus 40, in various embodiments, is a multi-dimensional actuator. As illustrated in FIG. 4A, one embodiment of apparatus 40 includes one or more bidirectional comb drive actuators 21a-d. One embodiment of actuator 40 also includes one or more cantilevers 44a-d. Cantilevers 44a-d each include a first end connected to one of bidirectional comb drive actuators 21a-d, and a second end connected to inner frame 46. As shown in FIG. 4A, one embodiment of apparatus 40 includes outer frame 48 connected to inner frame 46 by one or more spring elements 80. Additionally, bidirectional comb drive actuators 21a-d are, in one embodiment, connected to anchor 42, in a fashion substantially similar as described above with regard to FIG. 3.

Further to this embodiment, bidirectional comb drive actuators 21a-d may apply a controlled force between inner frame 46 and anchor 42. One or more bidirectional comb drive actuators 21a-d may be rigidly connected or attached to anchor 42, and anchor 42 may be mechanically fixed (e.g., rigidly connected or attached) with respect to outer frame 48. In one embodiment, a platform is rigidly connected or attached to outer frame 48 and to anchor 42. In this manner, the platform may mechanically fix outer frame 48 with respect to anchor 42 (and/or vice versa). Inner frame 46 may then move with respect to both outer frame 48 and anchor 42, and also with respect to the platform. In one embodiment, the platform is a silicon platform. The platform, in various embodiments, is an optoelectronic device, or an image sensor, such as a charge-coupled-device (CCD) or a complementary-metal-oxide-semiconductor (CMOS) image sensor.

The size of apparatus 40 may be substantially the same as the size as the platform, and the platform may attach to outer frame 48 and anchor 42, thus mechanically fixing anchor 42 with respect to outer frame 48. In one example implementation, the platform is the OV8835 image sensor from Omni Vision with an optical format of 1/3.2". In this implementation, the size of both apparatus 40 and the platform can be equal to about 6.41 mm by 5.94 mm. In one embodiment of apparatus 40, the platform is smaller than apparatus 40, and the platform attaches to inner frame 46. In this particular embodiment, outer frame 48 is fixed (or rigidly connected or attached) relative to anchor 42, and inner frame 46 is moved by the various bidirectional comb drive actuators 21a-d.

In one instance, cantilevers 44a-d are relatively stiff in the respective direction of motion of the respective bidirectional comb drive actuators 21a-d, and are relatively soft in the in-plane orthogonal direction. This may allow for bidirectional comb drive actuators 21a-d to effect a controlled motion of inner frame 46 with respect to anchor 42 and hence with respect to outer frame 48. Outer frame 48, in some implementations of apparatus 40, is not continuous around the perimeter of apparatus 40, but is broken into two, three, or more pieces. Similarly, inner frame 46 may be continuous or may be divided into sections, in various embodiments.

As shown in FIG. 4A, there may be four bidirectional comb drive actuators 21a-d. In one embodiment, two bidirectional comb drive actuators 21a/d actuate in positive and/or negative aspects of a first direction (east/west, or left/right) in the plane of apparatus 40, and two bidirectional comb drive actuators 21b/c actuate positive and/or negative aspects of a second direction (north/south, or top/bottom) in the plane of apparatus 40. The first and second directions may be substantially perpendicular to one another in the plane of apparatus 40. Various other configurations of bidirectional comb drive actuators 21a-d are possible. Such configurations may include more or less comb drives 10 in each of the bidirectional comb drive actuators 21a-d, and various positioning and/or arrangement of bidirectional comb drive actuators 21a-d, for example, to enable actuation in more or less degrees of freedom (e.g., in a triangular, pentagonal, hexagonal formation, or the like), as will be appreciated by one of skill in the art upon studying the present disclosure. In one embodiment, any of bidirectional comb drive actuators 21a-d may be replaced with comb drive actuators 20 or bidirectional comb drive actuators 23a-d.

Figure 4B:
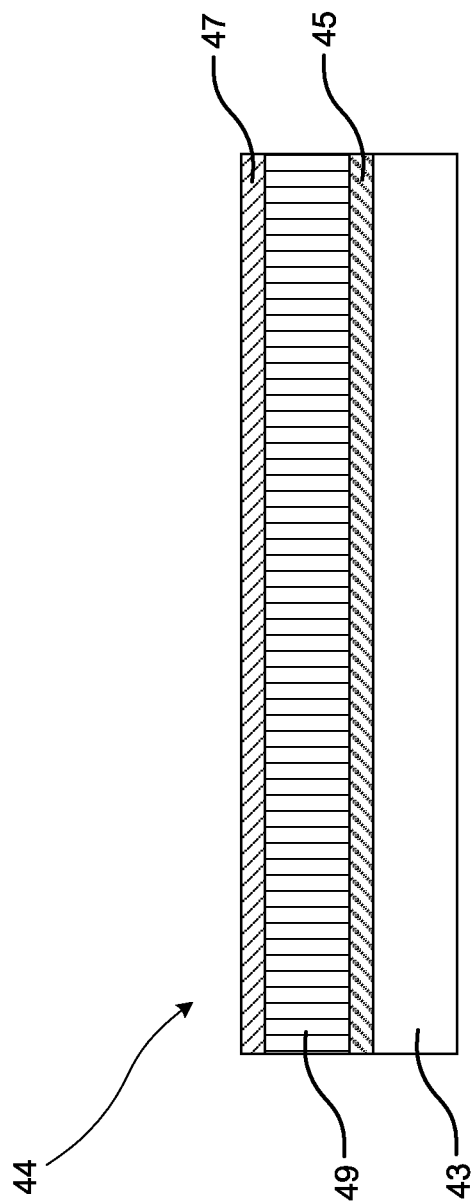
FIG. 4B illustrates a cross-sectional view of a cantilever in accordance with example embodiments of the present disclosure.

FIG. 4B illustrates a cross-sectional view of a portion of cantilever 44 in accordance with example embodiments of the present disclosure. In the illustrated embodiment, at least a portion of cantilever 44 includes multiple conductive layers. As illustrated in FIG. 4B, cantilever 44 may include first and second conductive layers 45 and 47, and first and second insulating layers 43 and 49. First and second conductive layers 45 and 47 may, in some example implementations, serve as routing layers for electrical signals, and may include poly silicon and/or metal. Insulating layers 43 and 49 may provide structure for first and second conductive layers 45 and 47.

In one example implementation of cantilever 44, insulating layers 43 and 49 include silicon dioxide, second conductive layer 57 includes metal, and first conductive layer includes polysilicon. In a variant of this example, a coating (e.g., oxide or the like) may cover second conductive layer 47, e.g., to provide insulation against shorting out when coming into contact with another conductor. Second insulating layer 49 may be a thin layer that includes oxide and/or the like. Additionally, first conductive layer 45, in some instances, may be relatively thick (compared to the other layers of cantilever 44), and may, for example, include silicon, polysilicon, metal, and/or the like. In such instances, first conductive layer 45 may contribute more than the other layers to the overall characteristics of cantilever 44, including, e.g., the nature, degree, and/or directionality of the flexibility thereof. Additional embodiments of cantilever 44 (and indeed cantilevers 44a-d) may include additional conductive layers, such that additional electrical signals may be routed via the cantilever 44. In generally, some embodiments of cantilevers 44a-d may be manufactured in a similar fashion to flexures 24a/b, though the sizing may be different between the two. Moreover, one of skill in the art will appreciate additional materials that may be used to form the various layers of cantilever 44 without departing from the spirit of the disclosure.

Referring again to FIG. 4A, one or more of bidirectional comb drive actuators 21a-d may apply a controlled force (e.g., a motive force, or an electrostatic force developed from a voltage, as described above) between outer frame 48 and inner frame 46. Embodiments of apparatus 40 may be suitable for moving a device (not shown) having electrical connections, because apparatus 40 enables precise, controlled, and variable motive forces to be applied between inner and outer frames 46 and 48 in multiple directions (including vertical, horizontal, for example) and degrees of freedom, and because apparatus 40 may be implemented using a highly compact footprint. Using various combinations and degrees of vertical and horizontal motive forces, apparatus 40 may achieve combinations of linear and rotational movement. Moreover, apparatus 40 may utilize MEMS devices for reduction in power. Accordingly, apparatus 40 provides multiple benefits over conventional solutions to optical image stabilization and autofocus applications constrained by size, power, cost, and performance parameters, such as in smartphone and other applications described herein.

As described above with regard to FIG. 2B, various motive forces may be developed using bidirectional comb drive actuators 21a-d. In some embodiments, in order to develop a number of options relating to these motive forces, multiple different electrical signals may be used. By way of example, various motive forces may be used to achieve translational, multi-directional, diagonal, and/or rotational movement in the plane of apparatus 40—e.g., such movement may be manifested by inner frame 46 relative to outer frame 48 and/or anchor 42. The number of possible combinations of various motive forces may generally increase the level of control of and precision over the movement achieved using apparatus 40. As such motive forces may typically be developed using a number of electrical signals, embodiments for routing these electrical signals throughout apparatus 40 will now be described.

As illustrated in FIG. 4A, one embodiment of apparatus 40 involves connecting inner frame 46 to outer frame 48 by one or more spring elements 80. Spring elements 80 may be electrically conductive and may be soft in all movement degrees of freedom. In various embodiments, spring elements 80 route electrical signals between electrical contact pads 82 on outer frame 48 to electrical contact pads 84 on inner frame 46. In example implementations, spring elements 80 come out from inner frame 46 in one direction, two directions, three directions, or in all four directions.

In one embodiment, apparatus 40 is made using MEMS processes such as, for example, photolithography and etching of silicon. Apparatus 40, in some cases, moves +/−150 micrometers in plane, and spring elements 80 may be designed to tolerate this range of motion without touching one another (e.g., so that separate electrical signals can be routed on the various spring elements 80). For example, spring elements 80 may be S-shaped flexures ranging from about 1 to 5 micrometers in thickness, about 2 to 20 micrometers wide, and about 150 to 1000 micrometers by about 150 to 1000 micrometers in the plane.

In order for spring elements 80 to conduct electricity well with low resistance, spring elements 80 may contain, for example, heavily doped polysilicon, silicon, metal (e.g., aluminum), a combination thereof, or other conductive materials, alloys, and the like. For example, spring elements 80 may be made out of polysilicon and coated with a roughly 2000 Angstrom thick metal stack of Aluminum, Nickel, and Gold. In one embodiment, some spring elements 80 are designed differently from other spring elements 80 in order to control the motion between outer frame 48 and inner frame 46. For example, four to eight (or some other number) of spring elements 80 may have a device thickness between about 50 and 250 micrometers. Such a thickness may somewhat restrict out-of-plane movement of outer frame 48 with respect to inner frame 46.

In various embodiments, the electrical signals may be delivered to bidirectional comb drive actuators 21a-d via routing on and/or in cantilevers 44a-d. As described above, in some instances, two or more different voltages may be used in conjunction with bidirectional comb drive actuator 21a. In such instances, two electrical signals may be routed to bidirectional comb drive actuator 21a via first and second conductive layers 45 and 47, respectively, of cantilever 44a. Once delivered to bidirectional comb drive actuator 21a, the two electrical signals may be routed, for example, via first frame piece 22a, to comb finger arrays 16a and 15b, respectively.

In another example implementation of apparatus 40, two electrical signals used to develop motive forces in bidirectional comb drive actuator 21*b* may also be used to develop similar motive forces in bidirectional comb drive actuator 21*c*. In such an implementation, rather than routing in these two electrical signals to bidirectional comb drive actuator 21*c* through cantilever 44*c*, the two electrical signals may be routed to bidirectional comb drive actuator 21*c* from bidirectional comb drive actuator 21*b*. By way of example, and referring in part to the numbered components of FIG. 3, this may entail routing the two electrical signals from electrical contact pad 86*a* or 86*b*, through cantilever 44*b* to first frame piece 22*a* of bidirectional comb drive actuator 21*b*. In addition, the two electrical signals may be routed from first frame piece 22*a* via flexures 24*a/b* (respectively) and second frame piece 22*b* to anchor 32 (or 42 in FIG. 4A). The two electrical signals may then be routed through anchor 42 to bidirectional comb drive actuator 21*c*. It will be appreciated that various routing options may be exploited to deliver electrical signals to bidirectional comb drive actuators 21*a-d*. For example, multiple routing layers may be utilized in anchor 42, in first or second frame pieces 22*a/b*, and/or in first and second flexures 24*a/b*.

Having described various implementations that may be used to route and distribute electrical signals throughout apparatus 40, the use of these signals to achieve various types of movements in the plane of apparatus 40 will now be described. In one example, various degrees of translational movement in a first horizontal direction (e.g., left) may be achieved by applying a first voltage to bidirectional comb drive actuators 21*a/d* (e.g., to respective comb finger arrays 16*a* relative to comb finger arrays 15*a*). To illustrate, a first electrical signal of between zero and 45 volts, variable with 14-bit resolution, may be applied to bidirectional comb drive actuators 21*a/d*.

In a substantially similar fashion, a second voltage may be applied to bidirectional comb drive actuators 21*a/d* (e.g., to respective comb finger arrays 15*b* relative to comb finger arrays 16*b*) to achieve translational movement in a second horizontal direction (e.g., right). As such, the combination of first and second electrical signals in this example allow for bidirectional movement in the plane of apparatus 40 with varying degrees of force according to an available bit resolution of each of the electrical signals. It will be noted that, for substantially horizontal movement, whether left or right, equal motive forces may be generated by bidirectional comb drive actuators 21*a/d*, and hence equal (or opposite) voltages may be applied.

Building upon this example, it will be understood that vertical (north/south) movement in the plane of apparatus 40 may be achieved in a substantially similar fashion as described above for horizontal movement (east/west). For instance, delivering one or more electrical signals to bidirectional comb drive actuators 21*b/c* may effect movement perpendicularly in the plane of apparatus 40 with to respect to the movement effected by bidirectional comb drive actuators 21*a/d*. In short, as described in these examples, combinations of bidirectional comb drive actuators 21*a/d* and 21*b/c* may be used to effect translational movement either horizontally (left/right or east/west) or vertically (top/bottom or north/south), in the plane of apparatus 40. In further embodiments, diagonal movement may be achieved in the plane of apparatus 40 by effecting vertical movement with bidirectional comb drive actuators 21*b/c*, and, at the same time, by effecting horizontal movement with bidirectional comb drive actuators 21*a/d*. Thus, diagonal movement may include aspects of movement in both the horizontal direction (east/west) and the vertical direction (north/south) at the same time (e.g., diagonal movement may include northeast or southwest, etc., in the plane of apparatus 40).

In still further embodiments, rotational movement (about the z-axis in the plane of apparatus 40) may be achieved by using additional combinations of electrical signals in conjunction with combinations of bidirectional comb drive actuators 21*a-d*. If, for example, equal and opposite motive forces are developed by bidirectional comb drive actuators 21*a/b*, clockwise or counterclockwise rotational movement may be effected. By way of illustration, if a motive force is developed in bidirectional comb drive actuator 21*a* to effect movement to the right, and a motive force is developed by bidirectional comb drive actuator 21*d* to effect movement to the left, the combination of these motive forces may achieve clockwise rotational movement. Counterclockwise movement may be achieved by developing motive forces in the opposite direction of the previous example—e.g., using voltages of opposite polarity. Rotational movement may likewise be achieved using bidirectional comb drive actuators 21*c/d*. Rotation and translation may be achieved in combination by, for example, in addition to developing equal and opposite motive forces by bidirectional comb drive actuators 21*a/d*, concurrently developing a vertical motive force using bidirectional comb drive actuators 21*b/c*.

In yet another embodiment, a combination of rotational and diagonal movement may be achieved in the plane of apparatus 40. By way of example, and in contrast to the purely rotation movement example described above, opposite motive forces of unequal magnitudes may be developed by bidirectional comb drive actuators 21*a/d*. In the case of the motive force developed by bidirectional comb drive actuator 21*a* being to the right (east) and being greater in magnitude than the motive force developed by bidirectional comb drive actuator 21*d*, which in this example would be to the left (west), a clockwise rotational movement would be achieved with simultaneous movement in the upper right diagonal direction (northeast) in the plane of apparatus 40. Further adaptations of such movement combinations will be apparent to one of skill in the art upon studying the present disclosure.

FIG. 5 illustrates a plan view of apparatus 50 in accordance with example embodiments of the present disclosure. Apparatus 50, in various embodiments, is a multi-dimensional actuator. As shown, one embodiment of apparatus 50 includes one or more bidirectional comb drive actuators 23*a-d*. Actuator 50 may also include one or more cantilevers 54*a-d*. Each of the cantilevers 54*a-d* includes a first end connected to one of the bidirectional comb drive actuators 23*a-d* and a second end connected to inner frame 56. Moreover, in some implementations, at least one of cantilevers 54*a-d* includes first and second conductive layers (see, e.g., FIG. 4B and associated description) for routing electrical signals. As further illustrated, one embodiment of apparatus 50 includes anchor 52, to which one of outer flexures 24*c/d* for each bidirectional comb drive actuator 23*a-d* may be connected.

As illustrated in FIG. 5 and explained with reference to FIG. 2C, each bidirectional comb drive actuator 23*a-d* may be designed so as to generate rotational movement in the plane of apparatus 50 when comb finger arrays 15*c/d* and/or 16*c/d* are electrified. In one example implementation of apparatus 50, cantilevers 54*a-d* convert this rotational movement to substantially linear movement that is substantially orthogonal (in the plane of apparatus 50) to the portion of inner frame 56 to which the respective cantilever 54*a-d* is connected. Comb finger arrays 15*c/d* and 16*/cd* of comb drives 10c/d, for example within bidirectional comb drive actuator 23a may be electrified to effect rotation movement of inner flexure 24e. Cantilever 54a may be connected to inner flexure 24e, which may push cantilever 54a up (i.e., vertically in the positive y, or north, direction in the plane of apparatus 50 in FIG. 5) toward inner frame 56 or pull cantilever 54a down (i.e., vertically in the negative y, or south, direction in the plane of apparatus 50 in FIG. 5) toward inner frame 56.

Continuing the example, cantilever 54a may be stiff along the length thereof (i.e., vertically, or north/south, in the plane of apparatus 50) but soft transverse to the length thereof (i.e., horizontally, or east/west, in the plane of apparatus 50). As such, the horizontal force component of the rotational movement from inner flexure 24e may be absorbed by cantilever 54a while the vertical force component may be transferred to inner frame 56. One of ordinary skill in the art will appreciate how this example may be adapted for cantilevers 54b-d and bidirectional comb drive actuators 23b-d, and will also appreciate that various configurations of cantilevers 54a-d are within the scope of the disclosure. In other respects, including, for example, the routing and distribution of electrical signals, the types of movement that may be achieved, and so on, apparatus 50 may be substantially similar to apparatus 40.

Figure 6:
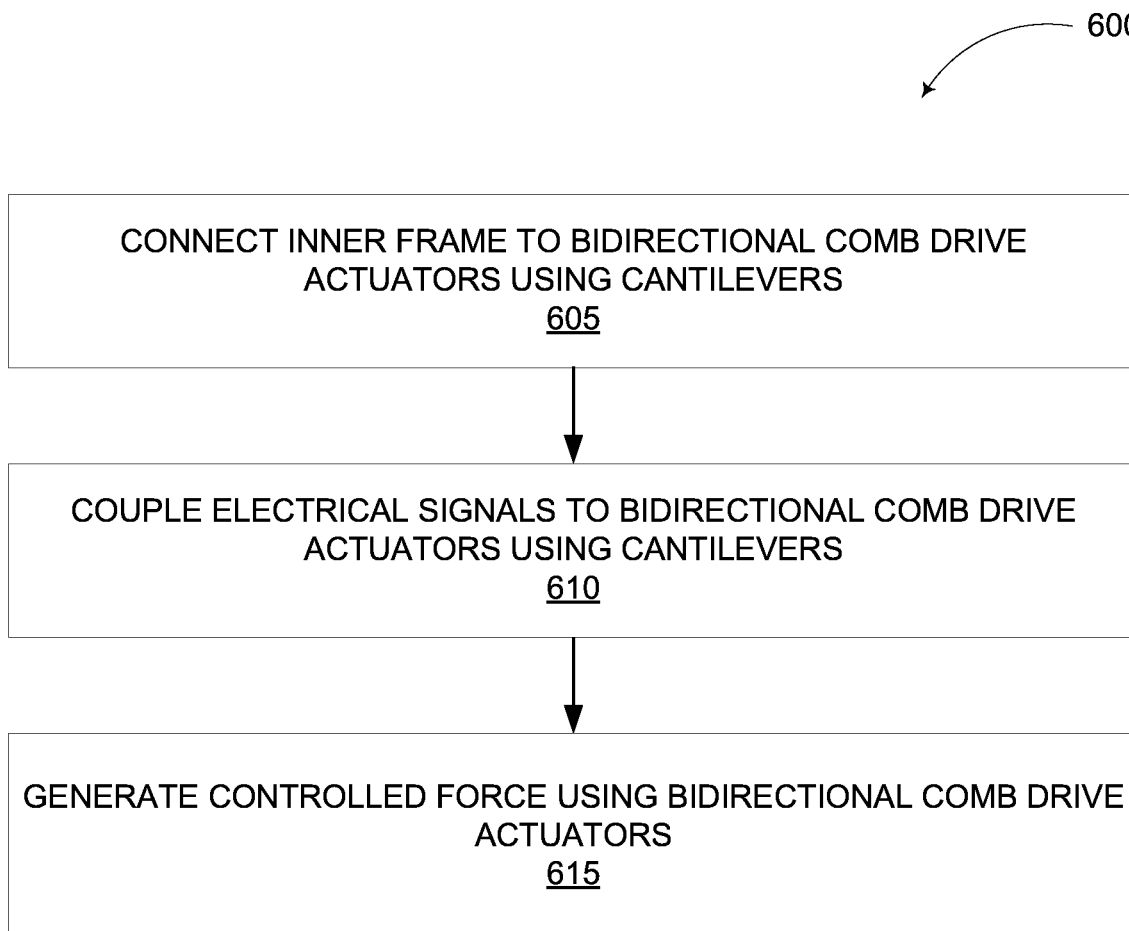
FIG. 6 illustrates an operational flow diagram of a method in accordance with example embodiments of the present disclosure.
Figure 7:
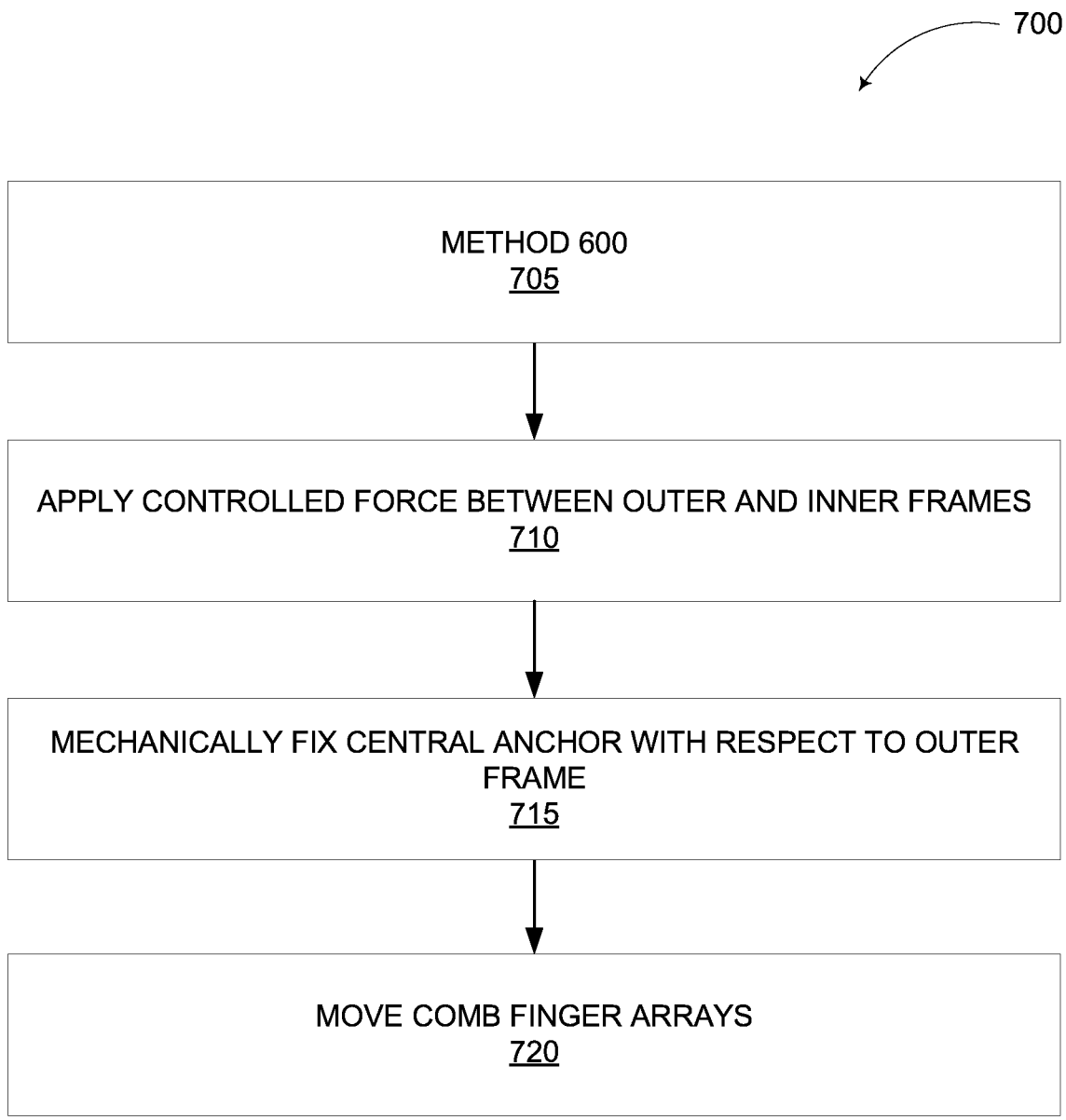
FIG. 7 illustrates an operational flow diagram of a method in accordance with example embodiments of the present disclosure.

FIGS. 6 and 7 illustrate embodiments of methods 600 and 700. Various operations of methods 600 and 700 may be used, for example, to move a device. The operations of methods 600 and 700 may utilize electrostatic comb drives to achieve highly precise and efficient movement and positioning of a device (e.g., that is part of or residing on the platform) in multiple directions and degrees of freedom and to achieve various types of movement, such as linear, translations, rotational, diagonal, or mixed movements. Moreover, methods 600 and 700 may be utilized, for example using various MEMS devices and structures described herein, within a space-constrained environment such as a smartphone. This allows for optical image stabilization and/or autofocus capabilities that meet the cost, space, and energy demands of such environments, as well as the need for dynamic, flexible, and nimble positioning and movement. In instances of the present disclosure wherein methods 600 or 700 are described with regard to the various elements (e.g., bidirectional comb drive actuators 21a-d) illustrated in any of the various figures (e.g., FIG. 4A), it will be understood that embodiments of method 600 and 700 may use or include various other elements described with regard to and/or illustrated by FIGS. 1, 2A-2C, 3, 4A, 4B, and/or FIG. 5, as will be appreciated by one of skill in the art upon studying the present disclosure.

As illustrated in FIG. 6, method 600 includes, at operation 605, connecting inner frame 46 to one or more bidirectional comb drive actuators 21a-d. This may be done, for example, using a cantilever 44a-d for each of bidirectional comb drive actuators 21a-d. At operation 610, method 600 includes coupling electrical signals to bidirectional comb drive actuators 21a-d using cantilevers 44a-d. At operation 615, method 600 includes generating a controlled force using one or more bidirectional comb drive actuators 21a-d. In one example implementation of method 600, the controlled force effects a movement in a plane (e.g., in the plane of apparatus 40 or 50), and the movement includes linear movement. Linear movement may be horizontal, vertical, or diagonal at any number of angles in the plane of apparatus 40 or 50. The movement may also include rotation movement and/or a combination of linear and rotational movement in the plane of apparatus 40 or 50.

Turning now to FIG. 7, which illustrates an operational flow diagram of method 700 in accordance with example embodiments of the present disclosure, one embodiment of method 700 includes, at operation 705, one or more of the operations of method 600. An additional embodiment of method 700 includes, at operation 710, applying the controlled force (see operation 615 of method 600) between inner frame 46 and outer frame 48. Yet another embodiment of method 700 includes, at operation 715, mechanically fixing anchor 42 with respect to outer frame 48, and applying the controlled force to anchor 42.

Bidirectional comb drive actuators 21a-d, in one embodiment of method 700, include first and second comb drives 10a/b, which, in this embodiment, each include first and second comb finger arrays 15a/b and 16a/b. This embodiment of method 700 may include, at operation 720, moving either second comb finger array 15b and first comb finger array 16a or first comb finger array 15a and second comb finger array 16b.

In another embodiment of method 700, bidirectional comb drive actuators 21a-d include flexures 24a/b. For one or more of bidirectional comb drive actuators 21a-d, coupling the electrical signals to bidirectional comb drive actuators 21a-d (e.g., at operation 610) includes, in this instance, using the flexures 24a/b to route the electrical signals. For example, as described above, flexures 24a/b may be used to route the electrical signals between two bidirectional comb drive actuators 21b/c in apparatus 40.

In general, the various operations of methods 600 and 700 described herein may be accomplished using or may pertain to components or features of the various systems and/or apparatuses with their respective components and subcomponents, described herein. Moreover, in various embodiments, features and functions described herein with regard to FIGS. 1, 2A-2C, 3, 4A, 4B, and 5, may be implemented as or using operations of methods (e.g., methods 600 and 700), in addition to being implemented as part of systems or apparatuses. As such, the variations described herein with regard to embodiments and aspects of the apparatuses may be applicable in a substantially similar fashion to the operations of the methods described herein (e.g., methods 600 and/or 700). Upon studying this disclosure, one of skill in the art will recognize how to implement the disclosed methods using the disclosed apparatuses and/or systems, and vice versa.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of example block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described example embodiments, and it will be understood by those skilled in the art that various changes and modifications to the previous descriptions may be made within the scope of the claims.

What is claimed is:

1. A multi-directional actuator for moving a device, the multi-directional actuator comprising:
   one or more bidirectional comb drive actuators, each of the bidirectional comb drive actuators comprising:
      two or more comb drives, each of the comb drives comprising first and second comb finger arrays extending from a first and second spine of the comb drives; and
      first and second frame pieces, wherein the first frame piece is parallel to the second frame piece, wherein at least a portion of each of the first and second frame pieces surrounds the two or more comb drives, wherein the first and second spines run vertically from the first frame piece to the second frame piece in parallel, and wherein the first spine is attached to the first frame piece and wherein the second spine is attached to the second frame piece;
      wherein the first comb finger array of the first comb drive and the second comb finger array of the second comb drive are connected to the second frame piece, and wherein the second comb finger array of the first comb drive and the first comb finger array of the second comb drive are connected to the first frame piece.

2. The actuator of claim 1, further comprising an inner frame connected to the bidirectional comb drive actuators by one or more cantilevers, each of the cantilevers comprising routing for a first electrical signal, at least one of the cantilevers further comprising routing for a second electrical signal.

3. The multi-directional actuator of claim 2, further comprising an outer frame connected to the inner frame by one or more spring elements, wherein the bidirectional comb drive actuators are attached to a central anchor that is mechanically fixed with respect to the outer frame.

4. The multi-directional actuator of claim 3, wherein, for each of the bidirectional comb drive actuators:
   the cantilever electrically couples the bidirectional comb drive actuator to one or more contact pads disposed on the inner frame; and
   the spring elements electrically couple the contact pads disposed on the inner frame to one or more corresponding contact pads disposed on the outer frame.

5. The multi-directional actuator of claim 2, wherein a platform mechanically fixes the central anchor with respect to the outer frame; and wherein the platform is selected from the group consisting of an optoelectronic device and an image sensor.

* * * * *